United States Patent
Wakamatsu

(10) Patent No.: US 7,136,015 B2
(45) Date of Patent: Nov. 14, 2006

(54) METHOD AND APPARATUS FOR SATELLITE POSITIONING

(75) Inventor: Kotaro Wakamatsu, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 11/098,007

(22) Filed: Apr. 1, 2005

(65) Prior Publication Data

US 2005/0259003 A1 Nov. 24, 2005

(30) Foreign Application Priority Data

Apr. 6, 2004 (JP) ............................. 2004-111930

(51) Int. Cl.
*G01S 1/02* (2006.01)
(52) U.S. Cl. ............................. 342/357.06; 342/357.08
(58) Field of Classification Search .......... 342/357.02, 342/357.06, 357.08, 357.12, 357.15; 701/207, 701/213, 214
See application file for complete search history.

(56) References Cited

U.S. PATENT DOCUMENTS

| 6,191,731 B1* | 2/2001 | McBurney et al. .... 342/357.05 |
| 6,211,819 B1* | 4/2001 | King et al. ............ 342/357.09 |
| 6,415,229 B1 | 7/2002 | Diekhans |
| 2005/0055160 A1* | 3/2005 | King ........................... 701/213 |
| 2005/0143949 A1* | 6/2005 | Hagstedt ..................... 702/145 |

FOREIGN PATENT DOCUMENTS

| JP | H05-297104 | 11/1993 |
| JP | H06-011560 | 1/1994 |
| JP | H06-066916 | 3/1994 |

* cited by examiner

*Primary Examiner*—Dao Phan
(74) *Attorney, Agent, or Firm*—Brinks Hofer Gilson & Lione

(57) ABSTRACT

When there is a large difference greater than a threshold value between a position determined at a time in satellite positioning by a GPS receiver based on a propagation delay of signals received from a GPS satellite, and an anterior position determined at an anterior time in satellite positioning by the GPS receiver, in position determination in a first period after the times, a present position is found based on a velocity vector found at the anterior time by the GPS receiver based on a Doppler shift occurring in the signals received from the GPS satellite and a previously determined position. In position determination in a second period after the first period, the present position is found based on a velocity vector found in the second period and the previously determined position. After that, processing is returned in which a satellite-determined position is used as a determined position.

16 Claims, 7 Drawing Sheets

FIG. 4A
FIG. 4B
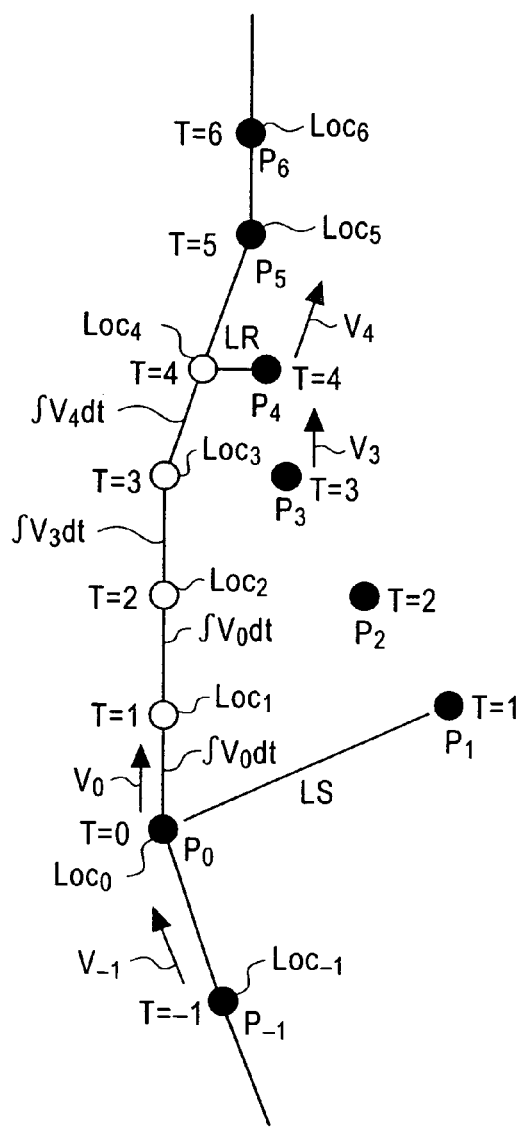
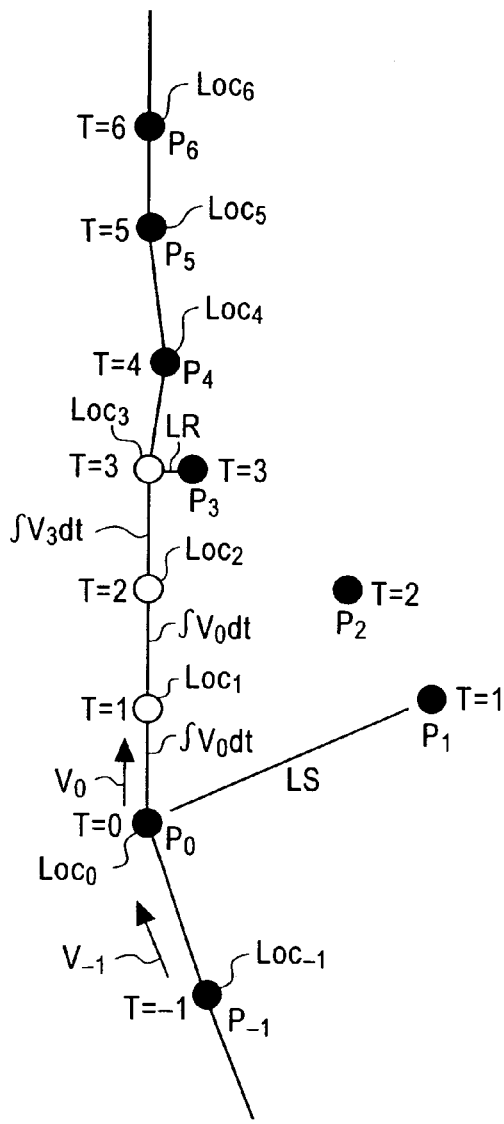

METHOD AND APPARATUS FOR SATELLITE POSITIONING

BACKGROUND OF THE INVENTION

1. Field of the Invention

The present invention relates to a satellite positioning apparatus, in a satellite positioning system such as the Global Positioning System (GPS), for determining the position of the satellite positioning apparatus based on signals received from satellites.

2. Description of the Related Art

GPS is a widely used satellite navigation system that includes a plurality of satellites and a satellite positioning apparatus that moves with a mobile object such as an automobile.

Positioning technology for GPS receivers select from satellites with receivable signals, a combination of satellites in which the optimal dilution of precision (DOP) may be determined depending on the geometric constellation of the satellites. A position by using signals received from the satellites may also be determined (e.g., Japanese Unexamined Patent Application Publication No. 5-297104).

Additionally, position determination and positioning error calculation for each of different combinations of satellites may be provided. Based on the determined position and positioning error, a range in which the error regions obtained for the combinations of the satellites mutually overlap presents the range in which the present position can exist (e.g., Japanese Unexamined Patent Application Publication No. 6-11560).

In addition to position determination with a GPS receiver, a velocity vector may also be calculated based on Doppler shifts of signals received from satellites (e.g., Japanese Unexamined Patent Application Publication No. 6-66916).

Positioning accuracy and error tendency vary depending on the combination of satellites used in position determination. Accordingly, a change in the combination of satellites used in position determination may cause a deterioration in positioning stability of a satellite positioning apparatus, so that large shifts in determined positions may occur. The occurrence of the large shifts in determined positions may cause a user to question the performance of the GPS system. Additionally, it is difficult to correct the position determined by the satellite positioning apparatus by using techniques such as map matching, which perform correction by collating the determined position with previously determined positions, loci represented by the positions' records, and a road map. Moreover, it often occurs that map matching further increases the shifts in positions.

SUMMARY OF THE INVENTION

It is an object of the present invention to suppress occurrence of shifts in positions determined in satellite positioning.

According to one embodiment of the present invention, a satellite positioning apparatus for performing present position determination based on signals received from a plurality of satellites is provided. The satellite positioning apparatus includes a satellite position-determining unit for performing satellite positioning by using the signals received from the plurality of satellites, a determined position output unit for outputting, as a determined position, a position determined in the satellite positioning by the satellite position-determining unit, and a velocity vector calculating unit for performing velocity vector calculation by using the signals received from the plurality of satellites. After a first predetermined condition is met such that a position change is greater than or equal to a predetermined level when a position is determined by the satellite position-determining unit, until a second predetermined condition is satisfied, the determined position output unit outputs a present position estimated based on a position determined in the satellite positioning by the satellite position-determining unit before the occurrence of the change and a velocity vector calculated by the velocity vector calculating unit before the occurrence of the position change as the determined position, in place of the position determined in the satellite positioning by the satellite position-determining unit.

Preferably, the second predetermined condition is satisfied when a predetermined time elapses after the first predetermined condition is satisfied. The second predetermined condition may also be satisfied when the estimated present position and the position determined in the satellite positioning by the satellite position-determining unit are close to each other within a predetermined distance.

The first predetermined condition may be satisfied when the position change greater than or equal to the predetermined level. Thus, if the position determined in the satellite positioning by the satellite position-determining unit and a combination of the satellites, which are used in the satellite positioning is significantly different from a previous position, the first predetermined condition may be met.

In a case in which, when the satellite position-determining unit fails in satellite positioning, and when a predetermined period does not elapse after the satellite position-determining unit last succeeds in satellite positioning, the determined position output unit may output the present position estimated based on the position determined in the satellite positioning by the satellite position-determining unit before the satellite position-determining unit fails in satellite positioning and the velocity vector calculated by the velocity vector calculating unit before the satellite position-determining unit fails in satellite positioning as the determined position in place of the position determined in the satellite positioning by the satellite position-determining unit.

Until a third predetermined condition is satisfied after the second predetermined condition is satisfied, the determined position output unit may output a present position estimated based on a previously determined position and a velocity vector last calculated by the velocity vector calculating unit.

The third predetermined condition may be satisfied when a predetermined time elapses after the first predetermined condition is satisfied. The third predetermined condition may also be satisfied when, after the first predetermined condition is satisfied, a time period is set to increase in proportion to the magnitude of the change in the position determined in the satellite positioning elapses. The third predetermined condition may also be satisfied when the estimated present position and the position determined in the satellite positioning by the satellite position-determining unit are close to each other within a predetermined distance.

The third predetermined condition may further be satisfied when at least the large change not less than the predetermined level occurs in the position determined in the satellite positioning by the satellite position-determining unit, and a combination of the satellites, which are used in satellite positioning by the satellite position-determining unit, changes at a predetermined level or greater.

According to another embodiment of the present invention, a navigation apparatus is provided that includes the above satellite positioning apparatus, and a map matching processor for calculating the present position by performing map matching on the determined position output by the determined position output unit in the satellite positioning apparatus, the map matching using a road map.

According to the navigation apparatus, a determined position with a large positional shift is suppressed. Therefore, the map matching processor enables good correction of a determined position into a correct present position. As a result, the navigation apparatus enables more appropriate calculation of the present invention. Thus, a rapid change in determined position can be suppressed, while calculating, as a determined position, a position estimated to be more appropriate.

After the reliability of satellite positioning recovers, a state is returned in which a satellite-determined position is used as a determined position. A positional shift occurring in the recovery may also be suppressed. Even if satellite positioning is temporarily unable to perform, a large change in determined position presented to the user can be prevented from occurring.

BRIEF DESCRIPTION OF THE DRAWINGS

FIGS. 4A and 4B are illustrations of example operations of the position determining process;

DESCRIPTION OF THE PREFERRED EMBODIMENTS

An embodiment of the present invention is described below by exemplifying an application of the present invention to a navigation system provided in an automobile.

Figure 1:
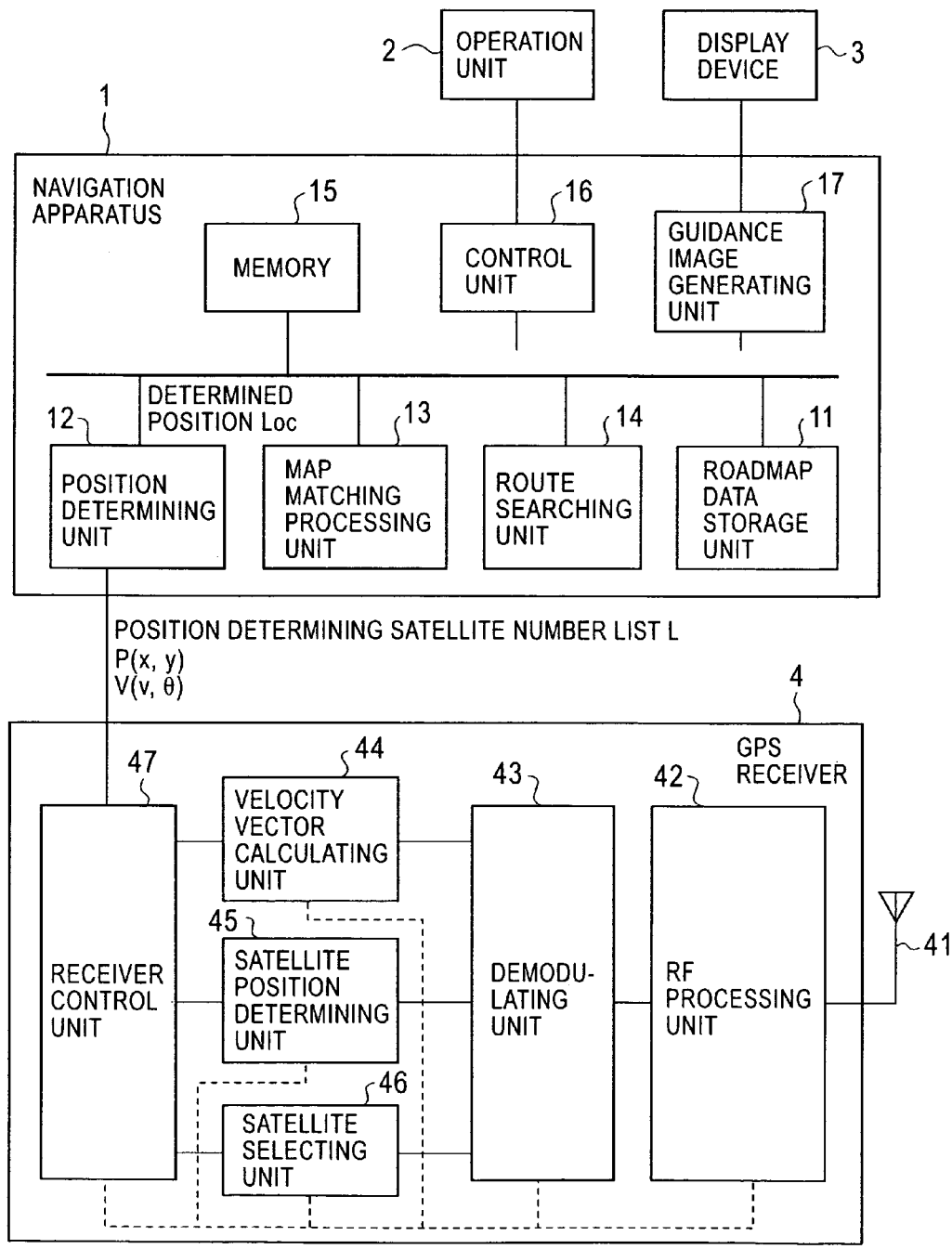
FIG. 1 is a block diagram showing a navigation system according to an embodiment of the present invention.

As shown in FIG. 1, the navigation system includes a navigation apparatus 1, an operation unit 2, a display device 3, and a GPS receiver 4. The navigation apparatus 1 includes a roadmap data storage unit 11 that is a storage unit (such as a digital versatile disk drive or a hard disk drive) storing roadmap data, a position determining unit 12, a map matching processing unit 13, a route searching unit 14, a memory 15, a control unit 16, and a guidance image generating unit 17.

The GPS receiver 4 includes an antenna 41, a RF processing unit 42, a demodulating unit 43, a velocity vector calculating unit 44, a satellite position determining unit 45, a satellite selecting unit 46, and a receiver control unit 47. The RF processing unit 42 performs processing such as amplifying signals received by the antenna 41, and converting the received signals into intermediate frequency signals. The demodulating unit 43 extracts, from the signals processed by the RF processing unit 42, signals transmitted from satellites, and demodulates the transmitted signals into baseband signals. The satellite selecting unit 46 selects satellites for use in position determination from the satellites whose transmitted signals can be demodulated into the baseband signals. The satellite position determining unit 45 performs satellite positioning using the baseband signal from each satellite selected by the satellite selecting unit 46. The velocity vector calculating unit 44 calculates the velocity vector (velocity magnitude v and traveling direction $\ominus$) of a mobile object provided with the GPS receiver 4 based on the value of a Doppler shift of the signal transmitted from the satellite selected by the satellite selecting unit 46.

The receiver control unit 47 controls the above units, and outputs, to the position determining unit 12 in the navigation apparatus 1, satellite-determined position P that is a position determined by the satellite position determining unit 45, velocity vector V calculated by the velocity vector calculating unit 44, position determining satellite number list L that is a list of the satellites selected by the satellite selecting unit 46.

The satellite selecting unit 46 selects a plurality of satellites that can perform satellite positioning with less error depending on the reception electric field intensity of radio waves transmitted from the satellites, angles of elevation for the satellites, and dilutions of precision. The number of satellites selected is at least three for two-dimensional positioning and is at least four for three-dimensional positioning. Known DOPs include horizontal DOP (HDOP) representing determined precision of a horizontal position, vertical DOP (VDOP) representing determined precision of a vertical position, position DOP (PDOP) representing determined precision of a horizontal and vertical position, time DOP (TDOP) representing determined precision of time, geometric DOP (GDOP) representing comprehensive determined precision based on a horizontal and vertical position and time. However, in this embodiment, it is preferable to use GDOP to select the satellites for use in satellite positioning.

Satellite positioning by the satellite position determining unit 45 is based on a propagation delay time of a signal transmitted from each satellite to the GPS receiver 4, and through known position of the satellite, the present position of the GPS receiver 4 is found. In calculation of the velocity vector by the velocity vector calculating unit 44, the velocity vector of the GPS receiver 4 is found based on a Doppler shift occurring in the signal transmitted from each satellite and the known position of the satellite. In other words, the satellite positioning on the present position and the calculation of the velocity vector are separately performed based on different measured values in a main part of the principle of measurement. Therefore, an error in satellite-determined position and an error in calculated velocity vector are mutually and separately generated. More specifically, even in a period in which positioning precision of the present position, in many cases, the accuracy of velocity vector calculation does not relatively deteriorate.

In the above-described configuration, the position determining unit 12 performs position determination (described later). Based on satellite-determined position P determined by the GPS receiver 4, velocity vector V determined by the GPS receiver 4, the position determining satellite number list L, which uses satellite numbers to represent a combination of satellites used by the GPS receiver 4 for satellite positioning, the position determining unit 12 repeatedly performs calculating and outputting determined position Loc to the map matching processing unit 13.

Next, the map matching processing unit 13 repeatedly calculates the present position and a traveling direction of the mobile object by implementing, based on determined position Loc, map matching with a road map around the previously determined present position read from the roadmap data storage unit 11, and setting the calculated present position and traveling direction in the memory 15. Specifically, the map matching processing unit 13 calculates, as the present position, a position on the road that most matches one of determined position Loc and the determined position Loc obtained by map matching between the locus of the determined position Loc and the map.

Next, the route searching unit 14 searches for a recommended route from the present position set in the memory 15 to a destination, which is set in the memory 15 after being received by the control unit 16 from a user through the operation unit 2, and sets the recommended route in the memory 15.

The guidance image generating unit 17 generates a guidance image in which the present position and recommended route set in the memory 15 are shown on the road map stored in the roadmap data storage unit 11, and displays the generated guidance image on the display device 3.

Figure 2:
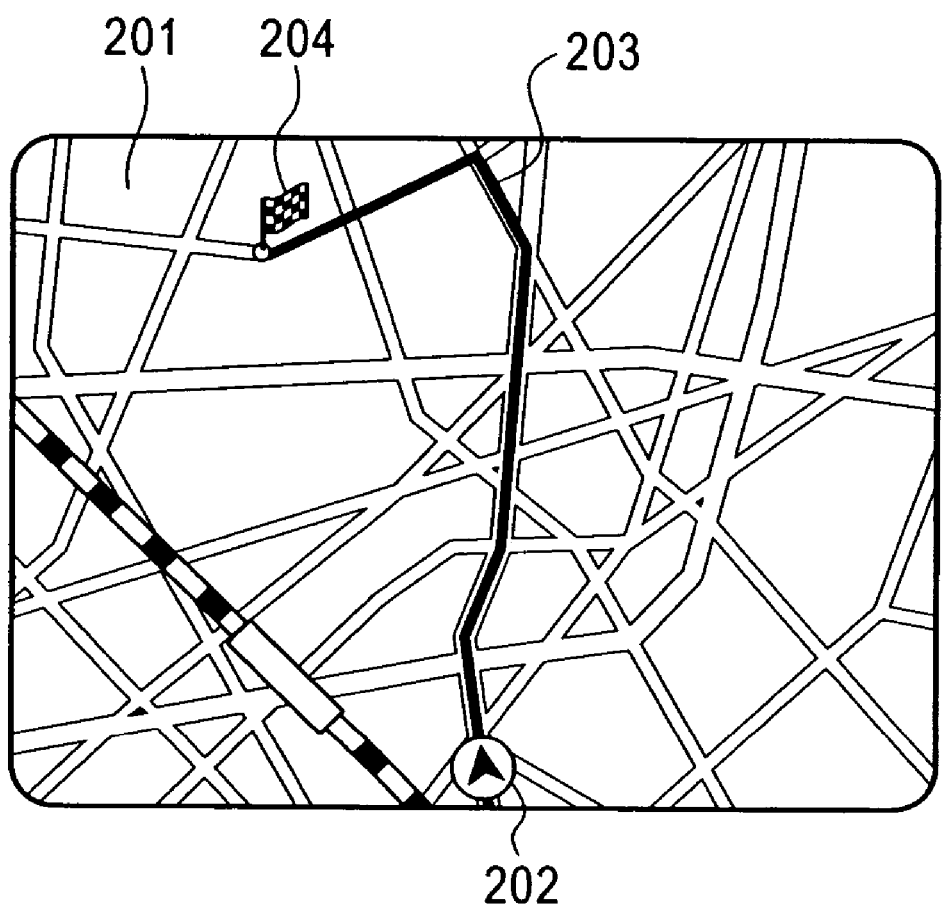
FIG. 2 is an illustration of a guidance image displayed.

FIG. 2 shows an example of the guidance image displayed as described above on the display device 3. As shown in FIG. 2, in the guidance image, a present position mark 202 indicating the present position and a route FIG. 203 indicating the recommended route are shown on a roadmap image 201 around the mobile object provided with the GPS receiver 4. If a display range of the roadmap image 201 includes the destination, a destination mark 204 indicating the destination is also indicated on the roadmap image.

When the present position set in the memory 15 is in the vicinity of the destination, the control unit 16 determines that the mobile object has arrived the destination, and performs clearing the destination and recommended route set in the memory 15.

Details of the position determining process for the position determining unit 12 in the navigation apparatus 1 to calculate determined position Loc are described below.

In the position determining process, a position determining mode is used as a parameter. The position determining mode takes one of three values representing a normal position determining mode, an inertial position determining mode, and a velocity-vector-reference position-determining mode.

Figure 3:
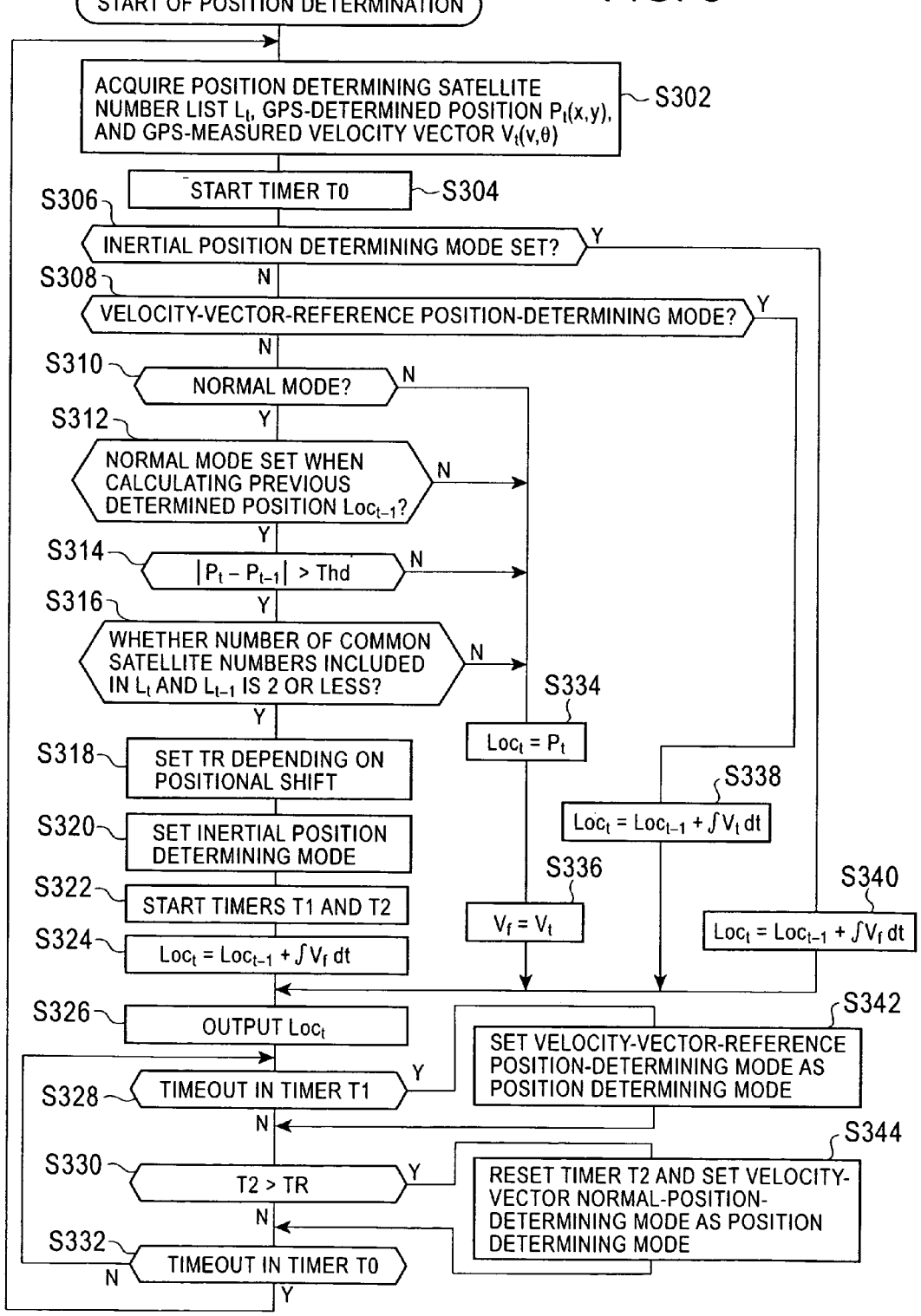
FIG. 3 is a flowchart showing a position determining process.

As shown in FIG. 3, in this position determining process, in act S302, the position determining unit 12 acquires, from the GPS receiver 4, GPS-determined position $P_t$ at the present time t which is determined by the GPS receiver 4, velocity vector $V_t$ at the present time t which is measured by the GPS receiver 4, and position determining satellite number list $L_t$ that uses satellite numbers to represent a combination of satellites used in satellite positioning at the present time t by the GPS receiver 4.

In act S304, timer T0 is started. Timer T0 is used to calculate determined position Loc periodically (e.g., at intervals of one second). The timeout time of timer T0 is, for example, one second.

In acts S306, S308, and S310, it is determined which of the inertial position determining mode, the velocity-vector-reference position-determining mode, and the normal position determining mode, is set as the present position determining mode. If the normal position determining mode is set, in act S312, it is determined whether the normal position determining mode is set as the position determining mode in the case of calculating previous determined position $Loc_{t-1}$.

In act S334, if the normal position determining mode is set as the position determination in the case of calculating previous determined position $Loc_{t-1}$, the GPS-determined position $P_t$ acquired from the GPS receiver 4 is directly used as determined position $Loc_t$. In act S336, velocity vector $V_t$ is set as reference velocity vector $V_f$. After that, the process proceeds to act S326.

If, in act S312, it is determined that the normal position determining mode is set as the position determining mode in the case of calculating previous determined position $Loc_{t-1}$, in act S314, it is determined whether a rapid positional shift has occurred between satellite-determined position $P_{t-1}$ acquired when previous determined position $Loc_{t-1}$ is calculated, and the GPS-determined position $P_t$ acquired in this time. More specifically, for example, it is determined whether the distance between the GPS-determined position $P_t$ acquired in this time and the satellite-determined position $P_{t-1}$ acquired when previous determined position $Loc_{t-1}$ is calculated is greater than threshold value Thd. If the distance is greater than threshold value Thd, it is determined that the rapid positional shift has occurred. As threshold value Thd, a distance in which the mobile object cannot move within the timeout time of timer T0. For example, when the timeout time of timer T0 is set to one second, that is, when determined position $Loc_t$ is calculated at intervals of one second, threshold value Thd is set to one hundred meters or the like.

If the rapid positional shift has not occurred, in act S334, the GPS-determined position $P_t$ acquired from the GPS receiver 4 is directly used as determined position $Loc_t$. In act S336, the velocity vector $V_t$ acquired in this time is set as reference velocity vector $V_f$. After that, the process proceeds to act S326.

In addition, if the rapid positional shift has occurred, in act S316, by comparing position determining satellite number list $L_t$ acquired in this time with position determining satellite number list $L_{t-1}$ used when previous determined position $Loc_{t-1}$ is calculated, it is determined whether the combination of satellites used in satellite positioning by the GPS receiver 4 has greatly changed. More specifically, for example, if the number of common satellites which are included in the position determining satellite number list $L_t$ acquired in this time and the position determining satellite number list $L_{t-1}$ acquired when previous determined position $Loc_{t-1}$ is calculated is two or less, it is determined that the combination of satellites used in satellite positioning has greatly changed.

If the combination of satellites used in satellite positioning has not greatly changed, in act S334, the GPS-determined position $P_t$ acquired from the GPS receiver 4 in this time is directly used as determined position $Loc_t$. In act S336, the velocity vector $V_t$ acquired in this time is set as reference velocity vector $V_f$. After that, the process proceeds to act S326.

If the combination of satellites used in satellite positioning has greatly changed, in act S318, reset time TR is set so that the greater the magnitude of the occurring positional shift is, the longer reset time TR is. For example, if the distance between the GPS-determined position $P_t$ acquired in this time and satellite-determined position $P_{t-1}$ acquired when previous determined position $Loc_{t-1}$ is calculated is one hundred meters, reset time TR is set to five seconds. If this distance is between 100 meters and 1 km, reset time TR is set so as to be incremented by three seconds whenever the distance is incremented by one hundred meters. If this distance is one kilometers or greater, reset time TR is set to 32 seconds.

In act S320, the inertial position determining mode is set as the position determining mode. In act S322, timers T1 and T2 are started. Timer T1 has a timeout time of, for example, one or two seconds.

In act S324, a position, obtained such that a displacement obtained by temporally integrating reference velocity vector $V_f$ for an elapsed time from the calculation of previous determined position $Loc_{t-1}$ to the present is added to previous determined position $Loc_{t-1}$, is used as determined position $Loc_t$. The process proceeds to act S324. In other words, a position, based on the assumption that the mobile object travels at velocity v represented by reference velocity vector $V_f$ in traveling direction $\ominus$ represented by reference velocity vector $V_f$ for the time from the calculation of previous determined position $Loc_{t-1}$ to the present time, is used as determined position $Loc_t$ in this time.

Next, the process returns to act S306. If, in act S306, it is determined that the inertial position determining mode is set as the position determining mode, similarly to act S324, in act S338, a position, obtained such that a displacement obtained by temporally integrating reference velocity vector $V_f$ for the elapsed time from the calculation of previous determined position $Loc_{t-1}$ to the present is added to previous determined position $Loc_{t-1}$, is used as determined position $Loc_t$ in this time. After that, the process proceeds to act S326.

If, in act S308, the velocity-vector-reference position-determining mode is determined to be set as the position determining mode, in act S340, a position, obtained by adding a displacement obtained by temporally integrating velocity vector $V_t$ acquired for the elapsed time from the calculation of previous determined position $Loc_{t-1}$ to previous determined position $Loc_{t-1}$, is used as determined position $Loc_t$. Next, the process proceeds to act S326. This process is based on the approximation that the mobile object travels at velocity v represented by reference velocity vector $V_f$ in traveling direction $\ominus$ represented by reference velocity vector $V_f$ for the time from the calculation of previous determined position $Loc_{t-1}$ to the present time, and thus is used as determined position $Loc_t$ in this time. In act S340, a position obtained by adding a displacement obtained by temporally integrating reference velocity vector $V_f$ for the elapsed time from the calculation of previous determined position $Loc_{t-1}$ to previous determined position $Loc_{t-1}$, may be also used as determined position $Loc_t$. Alternatively, in act S340, a position, obtained by adding a displacement obtained by temporally integrating a velocity vector obtained by averaging previously acquired velocity vector $V_{t-1}$ and the velocity vector $V_t$ acquired to previous determined position $Loc_{t-1}$, may be used as the determined position $Loc_t$.

If the determined position $Loc_t$ is calculated as described above, in act S326, the determined position $Loc_t$ acquired in this time is outputted to the map matching processing unit 13.

In act S328, the system determines whether timeout occurs in timer T1. In act S330, it is determined whether the time measured by timer T2 has exceeded reset time TR. In act S332, it is determined whether timeout occurs in timer T0. Only when the inertial position determining mode is set as the position determining mode does the timeout in timer T1 occur. Only when the velocity-vector-reference position-determining mode is set as the position determining mode does timer T2 perform time measurement.

If, in act S328, the timeout in timer T1 occurs before the timeout in timer T0 occurs, in act S342, the position determining mode is changed to the velocity-vector-reference position-determining mode. If, in act S330, the measurement time in timer T2 exceeds reset time TR before the timeout in timer T0 occurs, in act S344, timer T2 is reset to stop and the normal position determining mode is set as the position determining mode. If, in act S332, the timeout in timer T0 occurs, the process proceeds to act S302.

An example operation of the position determining process is shown in FIG. 4A. When the normal position determining mode is set as the position determining mode at time T(=−1) and time T(=0), positions $P_{-1}$ and $P_0$ determined in satellite positioning by the GPS receiver 4 are calculated as determined position $Loc_{t-1}$ at time −1 and determined position $Loc_0$ at time 0, respectively.

If at time T=1, distance Ls between position $P_1$ determined in satellite positioning by the GPS receiver 4 and position $P_0$ determined in satellite positioning by the GPS receiver 4 is greater than threshold value Thd, it is concluded that a positional shift has occurred. After that, it is determined whether the combination of position determining satellites greatly changes. If the combination of the satellites greatly changes, the position determining mode is switched to the inertial position determining mode. As determined position $Loc_1$ at time T=1, a position, obtained such that a displacement obtained by temporally integrating reference velocity vector $V_f$, which is a velocity vector ($V_0$ in FIG. 4A), for the time from T=0 to T=1 is added to the previous determined position ($Loc_0$ in FIG. 4A), is calculated.

In a predetermined subsequent period (a period up to the timeout of the timer T1 which starts when the inertial position determining mode is set), a position is calculated by adding a displacement obtained by temporally integrating reference velocity vector $V_f$ to the previous determined position. For example, in FIG. 4A, as determined position $Loc_2$ at time T=2, a position, obtained such that a displacement obtained by temporally integrating $V_0$, which is reference velocity vector $V_f$, for the time from the previous to present predetermined is added to previous determined position $Loc_1$ (T=1), is calculated.

Next, after a predetermined period elapses, i.e., when the timeout in timer T1 occurs, the position determining mode is switched to the velocity-vector-reference position-determining mode. In the example shown in FIG. 4A, the position determining mode, which is the inertial position determining mode at time T=2, is switched to the velocity-vector-reference position-determining mode up to time T=3.

At time T=3 at which the position determining mode has switched to the velocity-vector-reference position-determining mode, determined position $Loc_3$ is calculated by adding a displacement obtained by temporally integrating velocity vector $V_3$ detected at time t=3 by the GPS receiver 4 to previous determined position $Loc_2$ (at time T=2).

After that, in a predetermined period (period up to elapse of reset time TR after switching to the inertial position determining mode), similarly to the case of time T=3, a determined position is calculated by adding a displacement obtained by temporally integrating velocity vector V detected by the GPS receiver 4 to a previous determined position. For example, in FIG. 4A, the determined position $Loc_4$ at time T=4, a position is obtained by adding a displacement obtained by temporally integrating velocity vector $V_4$ detected by the GPS receiver 4 at time T=4 for the time from the previous to present position determination to previous determined position $Loc_3$ (at time T=3).

Next, after a predetermined period (period up to elapse of reset time TR after switching to the inertial position determining mode) elapses, the position determining mode is returned to the normal position determining mode. Subsequently, as long as the normal position determining mode is maintained, position P determined in satellite positioning by the GPS receiver 4 that time is calculated as determined position Loc. In FIG. 4A, the position determining mode is switched to the normal position determining mode at the time between time T=4 and T=5, and the position determining mode is maintained to the normal position determining mode at time T=5 and time T=6. At time T=5 and time T=6, positions $P_5$ and $P_6$ determined in satellite positioning by the GPS receiver 4 are calculated.

As described above, in this position determining process, if a large change (positional shift) in satellite-determined position P occurs when the combination of satellites used in satellite positioning by the GPS receiver 4 changes, in a first period after that, determined position at each time is calculated based on a velocity vector and determined position detected by the GPS receiver 4 before the positional shift occurs.

In this case, the predetermined velocity vector is used in the first period is because in a case in which the combination of the satellites changes and the determined position greatly changes, neither satellite positioning by the GPS receiver 4 nor velocity vector calculation by the GPS receiver 4 are not stably performed immediately after a satellite combination change, thus reducing the reliability of the GPS receiver 4.

In a second period after the first period elapses, the present determined position is determined based on the present velocity vector detected by the GPS receiver 4 and the previous determined position. However, as described above, in the second period, the present determined position may be based on the velocity vector previously found by the GPS receiver 4. Alternatively, the present determined position may be based on a velocity vector obtained by averaging the velocity vector previously found by the GPS receiver 4.

Position determination performed in the second period may use a present velocity vector after the first period elapses because the accuracy of velocity vector measurement by the GPS receiver 4 is typically reliable by this time. If the accuracy of velocity vector measurement by the GPS receiver 4 has not returned to sufficient accuracy in the second period, a positional shift in determined position is likely to occur.

After the second period elapses, the measurement returns to a state in which the position determined in satellite positioning by the GPS receiver 4 is used as a determined position.

Here, the second period (the time determined by reset time TR) is set so that, depending on initially occurring positional shift Ls, the larger the positional shift is, the longer the second period is. Accordingly, it is expected that, when the second period ends, the accuracy of position determination by satellite positioning by the GPS receiver 4 has returned to sufficient accuracy, and it is expected that the position determined by satellite positioning by the GPS receiver 4 and the position calculated based on the present velocity vector are sufficiently close to each other in distance. Therefore, if the position determined by satellite positioning by the GPS receiver 4 after the second period elapses is used as a determined position, an appropriate position can be calculated as a determined position without causing a positional shift in determined position.

Although, in the foregoing, after the position determining mode is switched to the inertial position determining mode, the data processing method is returned to the normal position determining mode after reset time TR elapses, the data processing method may be returned to the normal data processing method at the time that, after the position determining mode is switched to the inertial position determining mode, determined position $Loc_t$ and GPS-determined position $P_t$ are close to each other within a predetermined distance.

Figure 5:
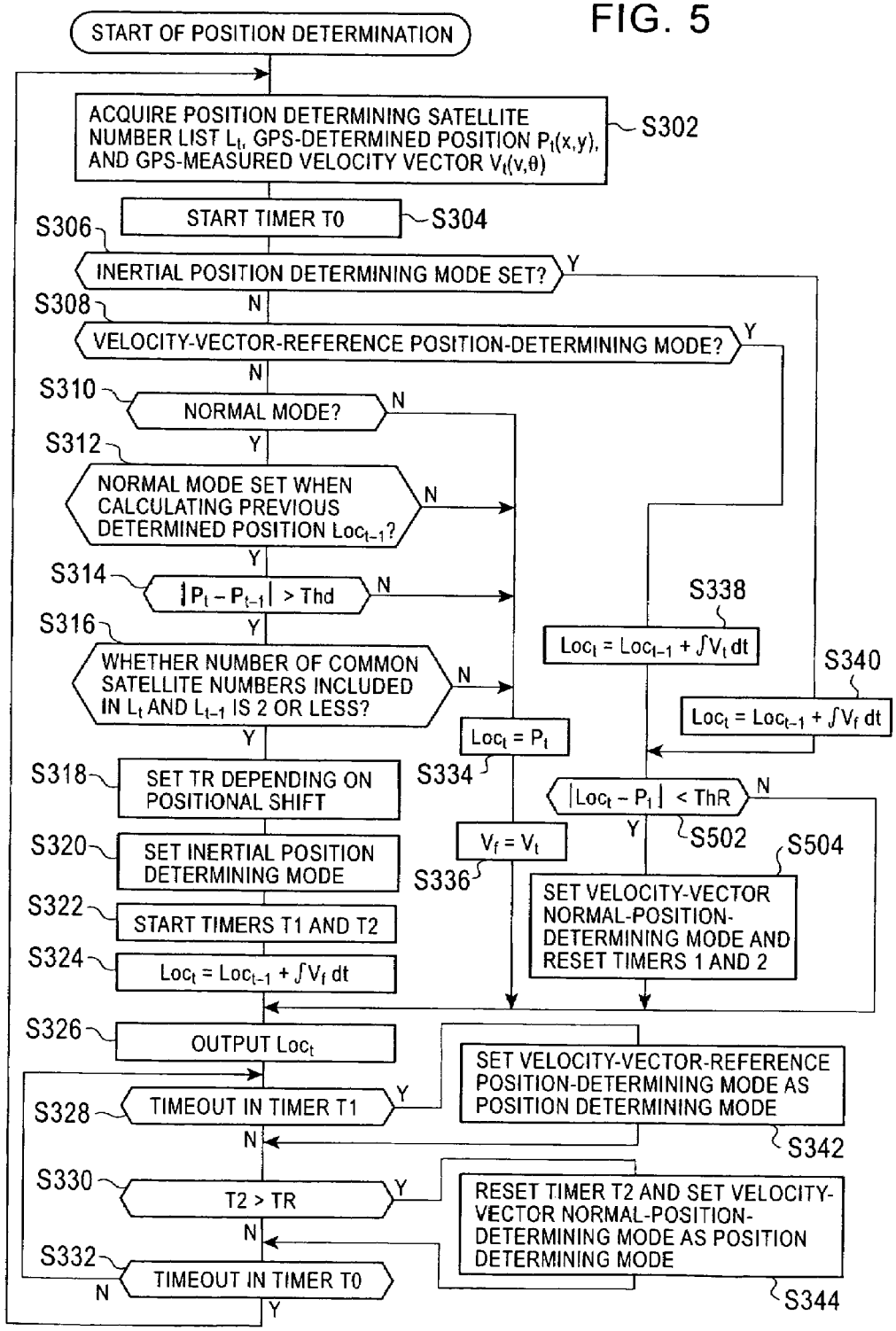
FIG. 5 is a flowchart showing a position determining process in accordance with an embodiment of the present invention.

As shown in FIG. 5, in this position determining process, after determined position $Loc_t$ is calculated in the inertial position determining mode or the velocity-vector-reference position-determining mode (in acts S338 and S340), acts S502 and S504 are added which perform determining the distance between determined position $Loc_t$ and GPS-determined position $P_t$ acquired in the present time, returning the position determining mode to the normal position determining mode when the distance is less than predetermined threshold value ThR, and resetting timers T1 and T2. Here, threshold value ThR is set to, for example, 20 meters or the like.

In this position determining process, acts S318, S330, and S344 concerning reset time TR and timer T2 may not be used.

This enables returning to the normal position determining mode, in which a satellite-determined position is used directly used as a determined position, without awaiting the elapse of a time, by determining that, as shown in FIG. 4B, the accuracy of satellite positioning recovers at the time (time T=3) that a determined position (determined position $Loc_3$) determined in accordance with one of the reference velocity vector and the present velocity vector, and the previous determined position, and the satellite-determined position ($P_3$ in FIG. 4B) are close to have a distance (indicated by LR in FIG. 4B), and that, even if the satellite-determined position is used as the determined position, no positional shift in determined position occurs. In other words, in the case shown in FIG. 4B, after time T=4 next to time T=3, satellite-determined positions $P_4$, $P_5$, . . . , calculated as determined positions $Loc_4$, $Loc_5$, . . . , respectively.

In the foregoing embodiment, in addition to the normal position determining mode, the inertial position determining mode and the velocity-vector-reference position-determining mode are provided as position determining modes. However, one of the inertial position determining mode and the velocity-vector-reference position-determining mode may be provided. In other words, if a change in the satellites used in satellite positioning is detected when a large shift in satellite-determined position occurs, the inertial position determining mode is used as the position determining mode. After that, at the time that a predetermined period has elapsed or when the satellite-determined position and the determined position are close to each other, the position determining mode may be returned to the normal position determining mode.

Alternatively, if a change in the satellites used in satellite positioning is detected when a large shift in satellite-determined position occurs, the velocity-vector-reference position-determining mode may be set as the position determining mode, and after that, at the time that a predetermined period has elapsed or when the satellite-determined position and the determined position are close to each other, the position determining mode may be returned to the normal position determining mode.

In the foregoing embodiment, if a change in the satellites used in satellite positioning is detected when a large shift in satellite-determined position occurs, the normal position determining mode is switched to one of the inertial position determining mode and the velocity-vector-reference position-determining mode. Further, when the large positional shift in satellite-determined position occurs, regardless of the change in the satellites in satellite positioning, the normal position determining mode may be switched to one of the inertial position determining mode and the velocity-vector-reference position-determining mode.

The position determining processes shown in FIGS. 3 and 5 may also be implemented in which an error mode and a blind mode are added as position determining modes.

Figure 6:
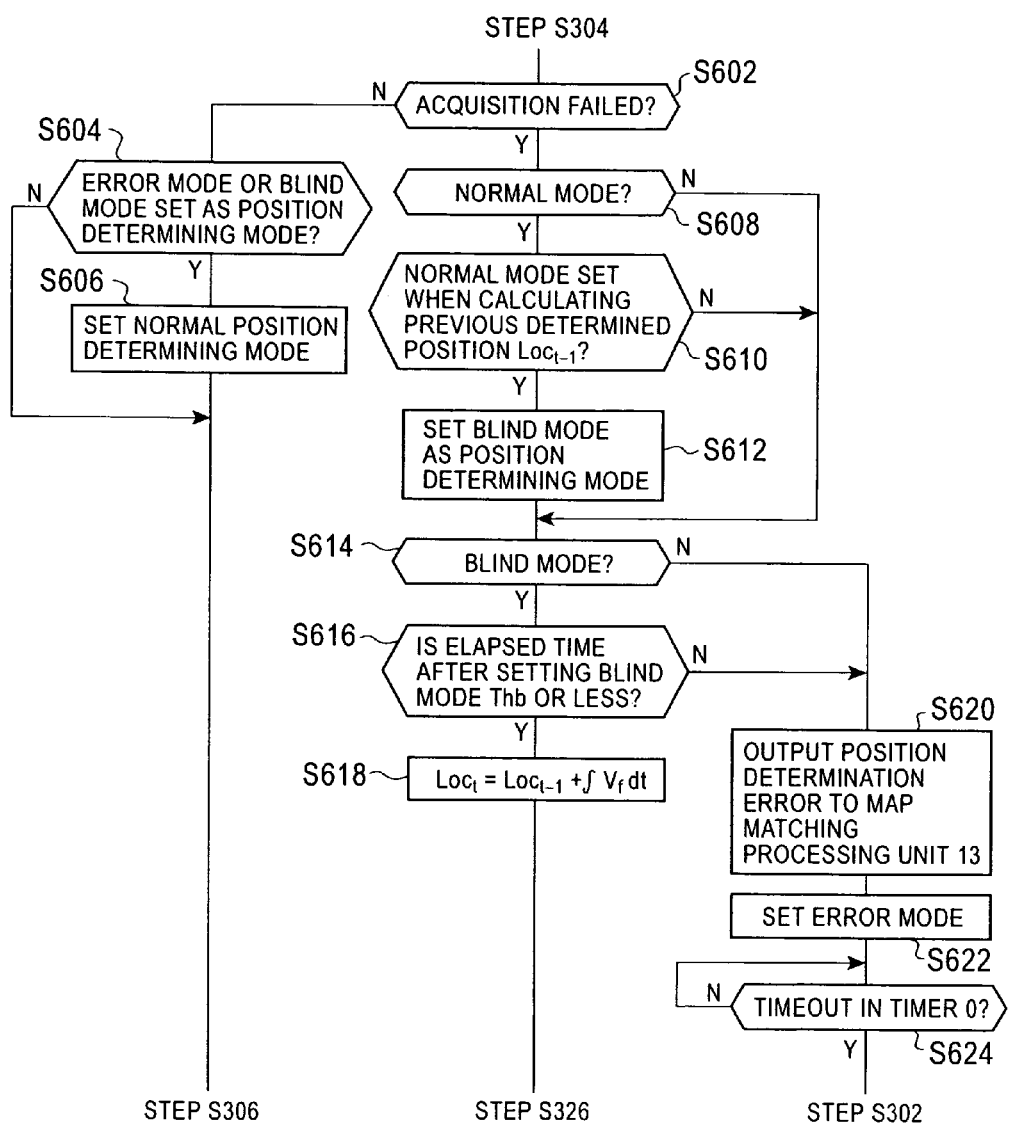
FIG. 6 is a flowchart showing another position determining process.

In this regard, after act S304 is executed in the position determining process in FIG. 3 or 5, the process may proceed to act S602 in FIG. 6.

In act S602 in FIG. 6, it is determined whether acquisition of GPS-determined position $P_t$ and velocity vector $V_t$ from the GPS receiver 4 has failed. If the acquisition has not failed, in act S604, it is determined which of the error mode and the blind mode is set as the present position determining mode. If one of the error mode and the blind mode is set, in act S606, the position determining mode is returned to the normal position determining mode, and the process proceeds to act S306 in the position determining process in FIG. 3 or 5. If neither the error mode nor the blind mode is set, the process directly proceeds to act S306 in FIG. 3 or 5.

If, in act S602, it is determined that the acquisition from the GPS receiver 4 has failed, in acts S608 and S610, it is determined whether both the present position determining mode and the position determining mode used when calculating previous determined position $Loc_{t-1}$ are the normal mode. If both are the normal modes, in act S612, the blind mode is set as the position determining mode, and the process proceeds to act S614. Alternatively, either is not the normal mode, the process directly proceeds to act S614.

In act S614, it is determined whether the blind mode is set as the position determining mode. If the blind mode is not set, in act S620, position determining error is output to the map matching processing unit 13. In act S622, the error mode is set as the position determining mode. In act S624, the timeout in timer T0 is awaited, and the process returns to act S302 in the position determining process in FIG. 3 or 5.

If, in act S614, the blind mode is set as the position determining mode, in act S616, it is determined whether an elapsed time after setting the blind mode is threshold value Thb (e.g., 2 seconds) or less. If the elapsed time is not threshold value Thb or less, in act S622, the error mode is set as the position determining mode. In act S624, the timeout in timer T0 is awaited, and the process returns to act S302 in the position determining process in FIG. 3 or 5.

Alternatively, if the elapsed time after setting the blind mode is threshold value Thb or less, in act S618, a position, obtained such that a displacement obtained by integrating reference velocity vector $V_f$ for the elapsed time from the calculation of previous determined position $Loc_{t-1}$ to the present is added to previous determined position $Loc_{t-1}$, is used as the determined position $Loc_t$ acquired in this time. The process proceeds to act S326 in the position determining process in FIG. 3 or 5.

In addition, the process may proceed to act S314. In act S314, it is determined whether a rapid positional shift has occurred between GPS-determined position $P_{t-x}$ finally acquired when calculating previous determined position $Loc_{t-x}$ in the normal position determining mode, and the GPS-determined position $P_t$ acquired in this time. If the rapid positional shift has occurred, the process may proceed to act S316. If the blind mode is used as the position determining mode used when calculating previous determined position $Loc_{t-1}$, in act S316, based on the fact that position determining satellite number list $L_{t-1}$ has not been acquired, it is determined that the satellites used in satellite positioning by the GPS receiver 4 have greatly changed.

By making these modifications to each of the position determining processes shown in FIGS. 3 and 5, even if satellite positioning cannot be performed in a short time by the GPS receiver 4, an advantage similar to that in the position determining process in FIG. 3 or 5 can be obtained.

Figure 7:
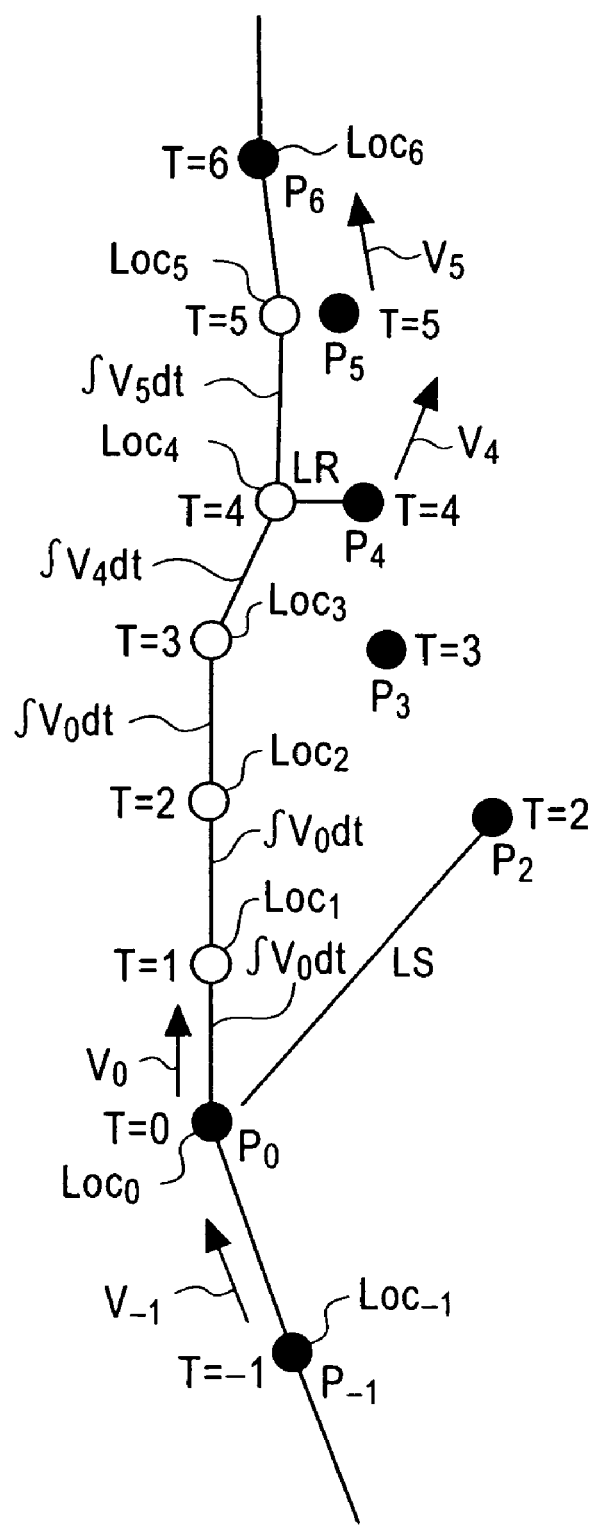
FIG. 7 is an example operation of the position determining process in accordance with an embodiment of the present invention.

For example, as shown in FIG. 7, after position determination is performed in the normal position determining mode at time T=−1 and time T=0 and satellite positioning by the GPS receiver 4 fails at time T1, the next position may be obtained by utilizing displacement obtained by temporally integrating reference velocity vector $V_f$, which is the velocity vector ($V_0$ in FIG. 7) found by the GPS receiver 4 (at time T=0).

After that, at time T=2, a large positional shift based on distance LS between position $P_0$ finally calculated in the normal position determining mode and determined position $P_2$ initially outputted after the GPS receiver 4 returns to the state capable of satellite positioning, and a large change in combination of position determining satellites are detected, and the inertial position determining mode is set as the position determining mode. Subsequently, similarly to the position determining process in FIG. 3 or 5, the inertial position determining mode (time T=2 and time=3) and the velocity-vector-reference position-determining mode (at time t=4 and time=5) are used to calculate determined positions. Finally, the position determining mode is returned to the normal position determining mode (at time=6 and thereafter).

Therefore, even if satellite positioning cannot be performed in a short time by the GPS receiver 4, the occurrence of the large positional shift in determined position can be prevented.

In an alternative embodiment, a computer including a central processing unit, the memory 15, and an external storage device may be used as the navigation apparatus 1. In this case, the position determining unit 12 and the map matching processing unit 13 may be realized such that the above computer executes a program defining the above-described position determination.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A satellite positioning apparatus for performing a present position determination based on signals received from a plurality of satellites, the satellite positioning apparatus comprising:

a satellite position-determining unit operable to periodically perform positioning of the satellite positioning apparatus based on signals received from a plurality of satellites and to calculate a determined position;

a determined position output unit operable to output one of either the determined position and an estimated present position; and a velocity vector calculating unit operable to perform velocity vector calculations based on signals received from the plurality of satellites;

wherein after a change in the determined position from a previous determined position that is greater than or equal to a predetermined level, the determined position output unit outputs the estimated present position in place of the determined position until a condition is satisfied, wherein the condition relates to at least a predetermined time period or a predetermined distance; and wherein the estimated present position is based on a position determined by the satellite position-determining unit before the occurrence of the change in the determined position from a previous determined position that is greater than or equal to the predetermined level and a velocity vector calculated by the velocity vector calculating unit before the occurrence of the change in the determined position from a previous determined position that is greater than or equal to the predetermined level.

2. The satellite positioning apparatus of claim 1, wherein the condition is satisfied when a predetermined time elapses after the change in the determined position from a previous determined position that is greater than or equal to the predetermined level.

3. The satellite positioning apparatus of claim 1, wherein the condition is satisfied when the estimated present position and the determined position are calculated to be within a predetermined distance.

4. The satellite positioning apparatus of claim 1, wherein the determined position output unit outputs the estimated present position in place of the determined position after a change in the determined position from a previous determined position that is greater than or equal to a predetermined level and a change in the plurality of satellites the satellite position-determining unit uses for positioning.

5. The satellite positioning apparatus of claim 1, wherein if the satellite position-determining unit is temporarily unable to perform positioning and the velocity vector calculating unit is temporarily unable to calculate a velocity vector, the estimated present position is outputted based on the position determined by the satellite position-determining unit before cessation of positioning and velocity vector calculation.

6. The satellite positioning apparatus of claim 1 further comprising:
a map matching processor operable to receive the determined position from the determined position output unit and to calculate a present position by performing map matching using road map data.

7. The satellite positioning apparatus of claim 1, wherein after the condition relating to at least a predetermined time period or a predetermined distance that occurs after the predetermined position output unit outputs the estimated present position in place of the determined position is satisfied, the determined position output unit continues to output the estimated present position until a second condition is satisfied, wherein the second condition relates to a time period that elapses after a change in a determined positioned.

8. The satellite positioning apparatus of claim 7, wherein the second condition is satisfied when a time period elapses after the change in the determined position from a previous determined position that is greater than or equal to the predetermined level.

9. The satellite positioning apparatus according to claim 8, wherein the time period increases in proportion to a magnitude of the change in the determined position from a previous determined position determined by the satellite position-determining unit.

10. The satellite positioning apparatus according to claim 7, wherein the second condition is satisfied when the estimated present position and the determined position are within a predetermined distance.

11. The satellite positioning apparatus according to claim 7, wherein the second condition is satisfied when a time period elapses after the change in the determined position from a previous determined position that is greater than or equal to the predetermined level and there is a change in the plurality of satellites the satellite position-determining unit uses for satellite positioning.

12. A satellite positioning method for performing present position determination based on signals received from a plurality of satellites, the satellite positioning method comprising the steps of:
performing positioning of a satellite positioning apparatus based on signals received from a plurality of satellites;
calculating a velocity vector based on signals received from the plurality of satellites;
outputting an estimated present position in place of a determined position in response to a change in the determined position from a previous determined position that is greater than or equal to a predetermined level; and
outputting a determined position calculated by the act of performing positioning in response to satisfaction of a predetermined condition relating to at least a predetermined time period or a predetermined distance.

13. The satellite positioning method of claim 12 wherein the predetermined condition is satisfied if a time period elapses after the change in the determined position from a previous determined position that is greater than or equal to the predetermined level.

14. The satellite positioning method of claim 12 wherein the estimated present position is outputted in place of the determined position in response to a change in the determined position from a previous determined position that is greater than or equal to a predetermined level and a change in the plurality of satellites a satellite position-determining unit uses for positioning.

15. The satellite positioning method of claim 12 wherein the estimated present position is determined by adding a displacement obtained by temporally integrating a velocity vector to a previous determined position.

16. A satellite positioning apparatus for performing a present position determination based on signals received from a plurality of satellites, the satellite positioning apparatus comprising:
a satellite position-determining unit operable to periodically perform positioning of the satellite positioning apparatus based on signals received from a plurality of satellites and to calculate a determined position;
a determined position output unit operable to output one of either the determined position and an estimated present position; and
a velocity vector calculating unit operable to perform velocity vector calculations based on signals received from the plurality of satellites;
wherein after a change in the determined position from a previous determined position that is greater than or equal to a predetermined level, the determined position output unit outputs the estimated present position in place of the determined position until a condition is satisfied, wherein the condition is satisfied when the estimated present position and the determined position are calculated to be within a predetermined distance; and
wherein the estimated present position is based on a position determined by the satellite position-determining unit before the occurrence of the change in the determined position from a previous determined position that is greater than or equal to the predetermined level and a velocity vector calculated by the velocity vector calculating unit before the occurrence of the change in the determined position from a previous determined position that is greater than or equal to the predetermined level.

* * * * *